J. B. RIGHTER.
GRAIN MILLING MACHINE.
APPLICATION FILED DEC. 19, 1921.
1,429,908.
Patented Sept. 19, 1922.
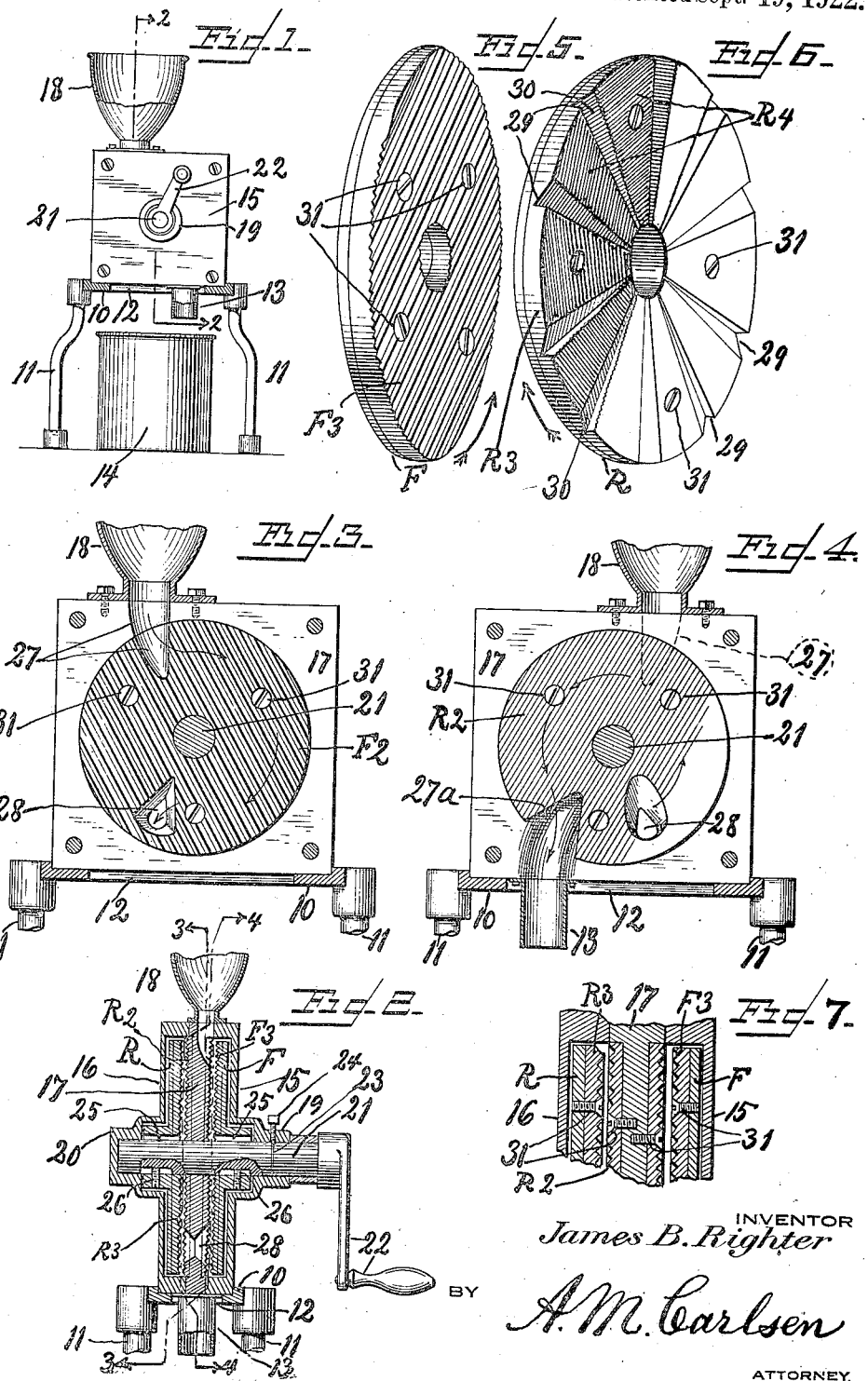

Patented Sept. 19, 1922.

1,429,908

UNITED STATES PATENT OFFICE.

JAMES B. RIGHTER, OF EAST ELLSWORTH, WISCONSIN.

GRAIN-MILLING MACHINE.

Application filed December 19, 1921. Serial No. 523,316.

*To all whom it may concern:*

Be it known that I, JAMES B. RIGHTER, a citizen of the United States, residing at East Ellsworth, in the county of Pierce and State of Wisconsin, have invented a new and useful Grain-Milling Machine, of which the following is a specification.

My invention provides an extremely simple and highly efficient grain milling machine especially adapted for home use for the grinding of wheat, other grains, coffee and the like. All grains, coffee and the like are much more nutritious, wholesome and tasteful when freshly ground. This is especially true in respect to wheat. Moreover, wheat, for example, should be ground with the bran and heart contained therein. Wheat, thus ground, will not keep for any great length of time and, hence, should be ground but a very short time before it is used. My improved mill meets all of the above conditions.

The mill comprises a pair of opposed laterally spaced disks and an interposed non-rotary grinding plate or partition, combined with a casing and certain other features, which adapt the grain to be fed through the mill when the partition and disks are in upright operative positions.

In the accompanying drawings, which illustrate the invention, like characters indicate like parts throughout the several views.

In said drawing:

Fig. 1 is a front elevation of the mill with some parts in section.

Fig. 2 is a vertical section taken approximately on the irregular line 2—2 in Fig. 1.

Fig. 3 shows the mill as intersected on the line 3—3 in Fig. 2.

Fig. 4 is a section one line 4—4 in Fig. 2.

Fig. 5 is a perspective showing the front grinding disk F, part of the grinding face of the disk being indicated in diagram only.

Fig. 6 is a perspective view of the rear grinding disk R.

Fig. 7 is an enlarged portion of Fig. 2.

Referring to the drawing by reference numerals and letters, 10 designates a base plate supported either upon a table or bench or preferably on legs 11. The base has a large aperture 12, down through which depends a delivery spot 13 of the mill, for discharging the ground products into a receptacle 14.

Said spout 13 projects from a case or shell mounted upon the base and composed of two half-shells 15—16, detachably secured to a vertical partition 17 and having its top provided with a supply hopper 18 and its front and rear side with bearings 19—20.

Journaled in said bearings and in the partition 17 is a shaft 21 having its front end provided with a hand crank 22, or any other suitable means for rotating the shaft. The shaft may have a peripheral groove 23 engaged by the end of a screw 24 (see Fig. 2) so as to prevent accidental sliding of the shaft and at the same time make its removal easy when so desired.

Secured on the shaft 21 by keys 25 or other suitable means, are two grinding disks F and R, each of which may be adjusted toward and away from the partition 17 and held in adjusted position by a screw 26 (shown in Fig. 2). It may here be noted that the upper portion of the partition is provided with a radial groove 27 by which to guide the grain from the supply hopper 18, down between the partition and the front disk F; and in its lower portion is an aperture 28 admitting partly ground grain to pass through to the rear disk R which finishes the grinding. The partition also has a rear groove 27$^a$ leading to the outlet spout 13.

The front side of the fixed partition is provided with a grinding face F$^2$ having sharp oblique corrugations designed to coact with similar corrugations on the grinding face F$^3$ of the adjacent front disk F.

The rear side of the partition is formed with a more finely corrugated grinding face R$^2$ arranged to coact with light corrugations R$^4$ of the grinding face R$^3$ of the rear disk R. The grinding face R$^3$ is formed with deep radial grooves 29, which may have transverse corrugations 30 tending to retard the discharging of the stock until it is fully ground; such retarding is further and especially caused by the oblique position of the corrugations R$^4$ relative to the radial grooves 29.

Any or all of the grinding faces may be formed integral with the disk carrying same or with the partition 17, but for large mills it may be preferable to form the grinding surface on a facing secured by screws 31 so as to facilitate their replacement by new ones when they are worn out, or their removal for grinding to sharpen them, or for exchange with facings with finer or coarser corrugations. This will also adapt the same machine for different grinding actions and for different speeds.

While I have shown my machine as placed with the shaft in horizontal position I do not mean to limit it to such position.

In the operation of the machine, the grain passes from the hopper in between the partition and the front grinding disk, where a preliminary grinding takes place; the thus partly ground stock then passes gradually through the aperture 28 and is further ground between the rear disk and the adjacent face of the partition and is then gradually discharged through the spot 13 into the receptacle 14.

Having thus described my invention what I claim is:

A grain milling machine comprising a case having intake and discharge ports, a vertically disposed partition secured in said case and having grinding surfaces on its opposite faces, a pair of rotary disks working in said case one at each side of said partition and having each a grinding face co-operating with the adjacent grinding face of the partition, said partition having an upwardly opening receiving duct registering with the intake port of the case and opening downwardly toward the grinding face of one of the disks, and said partition having also a transfer port through its lower portion, through which the partially ground material may be passed from one side to the other of said partition.

In testimony whereof I affix my signature.

JAMES B. RIGHTER.